United States Patent [19]

Schreiber et al.

[11] Patent Number: 5,230,661
[45] Date of Patent: Jul. 27, 1993

[54] SHAFT ASSEMBLY INCLUDING A TUBE OF FIBER SYNTHETIC COMPOSITE MATERIAL AND A CONNECTION ELEMENT OF RIGID MATERIAL AND METHOD OF MAKING IT

[76] Inventors: Wolfgang Schreiber, Ludwig Erhard Str. 5, 3170 Gifhorn; Dieter Schuldig, Spitzwegstrasse 33, 3300 Braunschweig, both of Fed. Rep. of Germany

[21] Appl. No.: 689,451

[22] Filed: Apr. 22, 1991

[30] Foreign Application Priority Data

Apr. 20, 1990 [DE] Fed. Rep. of Germany ....... 4012564

[51] Int. Cl.⁵ .................... F16C 3/02; F16G 11/05
[52] U.S. Cl. ................... 464/181; 403/275; 403/282; 464/182; 464/183
[58] Field of Search ............... 464/181, 183, 32, 182, 464/30; 403/2, 282, 359, 280, 291, 265, 299, 275

[56] References Cited

U.S. PATENT DOCUMENTS

| | | | |
|---|---|---|---|
| 4,238,539 | 12/1980 | Yates et al. | 464/181 X |
| 4,663,819 | 5/1987 | Traylor | 464/181 X |
| 4,792,320 | 12/1988 | Nickel | 464/181 |
| 4,895,351 | 1/1990 | Devaud | 464/181 X |
| 4,932,924 | 6/1990 | Löbel | 464/183 X |

FOREIGN PATENT DOCUMENTS

| | | | |
|---|---|---|---|
| 3007896 | 3/1985 | Fed. Rep. of Germany . | |
| 3421191 | 12/1985 | Fed. Rep. of Germany | 464/181 |
| 955368 | 4/1964 | United Kingdom | 464/32 |

*Primary Examiner*—Daniel P. Stodola
*Assistant Examiner*—William G. Battista, Jr.

[57] ABSTRACT

A shaft assembly is assembled by press-fitting a tube of fiber-synthetic material and a rigid connection structure which includes an outer sleeve and an inner connecting member. The outer sleeve has axially extending inward projections which engage the tube at one end of the sleeve and the inner connecting member at the other end of the sleeve. This permits the sleeve and the inward projections therein to be made in a simpler manner.

12 Claims, 1 Drawing Sheet

SHAFT ASSEMBLY INCLUDING A TUBE OF FIBER SYNTHETIC COMPOSITE MATERIAL AND A CONNECTION ELEMENT OF RIGID MATERIAL AND METHOD OF MAKING IT

BACKGROUND OF THE INVENTION

This invention relates to shaft assemblies having a tube part made of a composite fiber-containing synthetic material and a connecting part of rigid material attached to the tube and to methods of making such assemblies.

A method of making shafts of this general type is disclosed in German Offenlegungsschrift No. 3 007 896. In the shaft assembly described therein, cutting teeth are formed in an outer sleeve and, when a tube made of synthetic material and the outer sleeve are pressed together, the teeth cut into the synthetic material of the tube, producing interlocking geometrically matched profiles to form a rotationally fixed connection between tube and outer sleeve. To enhance the effect of the cutting teeth in the outer sleeve, a supporting ring is provided against the inside wall of the tube of fiber-synthetic material.

SUMMARY OF THE INVENTION

It is an object of the present invention to provide a shaft assembly having a composite synthetic tube and a connecting part of rigid material which overcomes the disadvantages of the prior art.

Another object of the invention is to provide an improved shaft assembly of the above type in which the connecting part is a cup-shaped structure having internal tube-engaging projections.

A further object of the invention is to provide a new and improved method of making a shaft assembly having a composite synthetic tube and a connecting part of rigid material.

These and other objects of the invention are attained by providing a cup-shaped connecting structure having an outer cylindrical-shaped sleeve with inwardly-directed tube-engaging projections and an inner member press-fitted in one end of the outer sleeve and having a surface which engages the tube-engaging projections therein.

Since the cup-shaped connecting structure is made of two assembled parts rather than a single piece, it is possible to form the inwardly-directed projections of the outer cylindrical sleeve by a convenient procedure. This can be achieved in a simple and economical manner by machining, for example, by broaching or by another groove- or projections-forming operation. The body of the outer sleeve may, for example, be cut in desired lengths from a drawn metal tube and then formed with the engaging projections. In principle, however, the engaging projections, which extend lengthwise, or axially, in the inner tube surface, may be formed in the semifabricated metal tube stock, or even during production of the metal tube stock, as a possible alternative. In addition to having the high strength required for the shaft assembly, the material of the outer sleeve, which is metal as a general rule, must understandably be insensitive to the notching resulting from the engaging projections since, during operation of the shaft assembly, there will be high stresses in the rotational direction in the outer sleeve.

These advantages of the invention can be achieved in practice without any additional cost in the manufacture of the cup-shaped connecting structure since the engaging projections of the outer sleeve, which affix the connecting structure to the synthetic tube, are also utilized to affix the inner member to the outer sleeve. Because the inner surface of the outer sleeve is cylindrical, it is possible to form engaging projections on that surface which continue throughout its length in a simple manner. As a result, two regions of the inner surface of the sleeve are provided with projections for affixing to the sleeve both the tube of fiber-synthetic composite material and the inner member forming one end of the cup-shaped connecting structure.

The dimensions of the outer sleeve and of the synthetic tube and the shape of the engaging projections are arranged so that the engaging projections only deform the tube elastically when they are pressed against the outer surface of the tube and do not dig or scrape depressions in it in a manner similar to a machining operation. As has been mentioned above, shaft assemblies of this kind are subjected to comparatively high torques in service when used as universal joint or driveshaft assemblies in motor vehicles. Hence the method of production used in the prior art described above for a positive geometrical attachment between the tube and the outer sleeve, i.e., by providing cutting teeth on the inner surface of the outer sleeve which cut corresponding grooves in the tube, is extraordinarily disadvantageous to the operational properties of such shaft assemblies. The cutting effect substantially reduces the strength of the composite synthetic tube in the region of attachment, especially when fibers in the composite tube are damaged or actually severed by the described cutting operation.

For this reason, the press-fitting of the tube and the cup-shaped structure which joins then by elastic deformation of the tube without cutting is especially expedient since it avoids a machining action on the tube. Moreover, the deformation of the tube during pressing of the tube and outer sleeve together, with or without any elastic or plastic deformation of the outer sleeve member, always occurs in the radial direction. To assist this press-fitting, it may be expedient to apply an adhesive liquid to the cooperating surfaces of the three constituent parts of the shaft assembly before pressing them together. The adhesive material not only serves as a lubricant during the pressing operation, but also serves to additionally secure the attachment of the parts upon setting of the adhesive after the pressing operation has been completed.

For attachment of the inner member of the cup-shaped structure to the outer sleeve, the outer surface of the inner member may be formed with engaging projections which cooperate with the engaging projections on the inner surface of the outer sleeve when they are pressed together. Alternatively, the diameter and material of the inner member may be selected so that the inwardly-directed projections of the outer sleeve will cut into the surface of the inner member when they are pressed together in the manner of a cutting tool. In other words, it is not necessary in this case to limit the action of the press-fitting to elastic deformation of the parts.

The principles described above for an advantageous design of the attachment between the outer sleeve and the synthetic tube, which avoids any cutting action on the tube, are especially important when the orientation of the fibers within the tube extend predominantly in circumferential direction in the region of attachment of the tube and the sleeve. This is because with such orientation of the fibers a machining action of the engaging projections of the outer sleeve on the tube may easily damage or even sever the fibers of the tube material.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
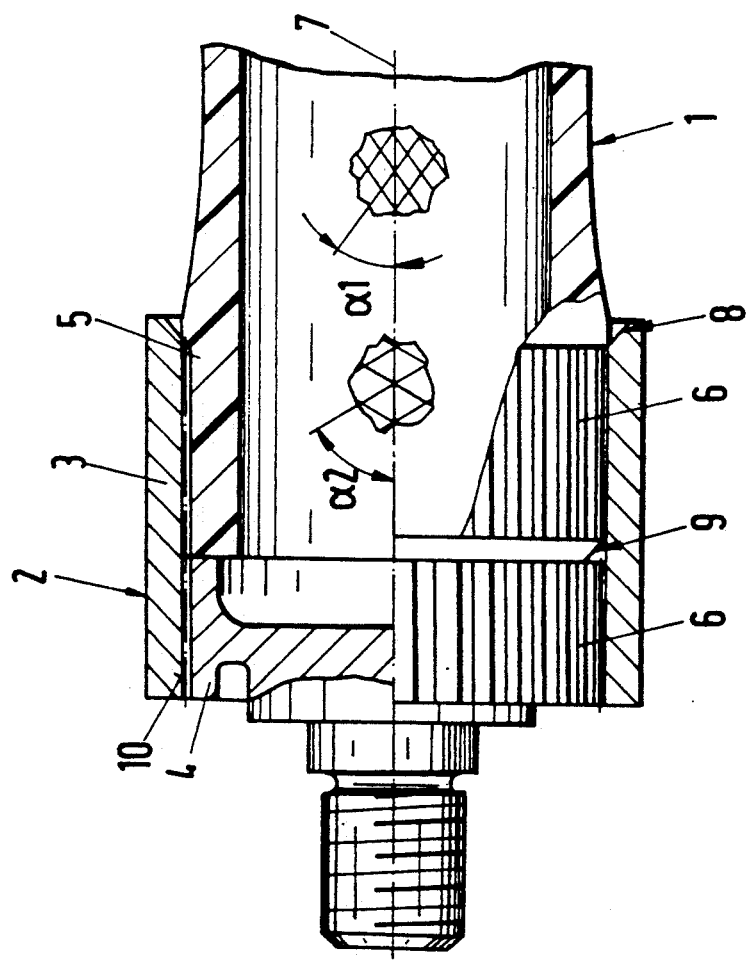
FIG. 1 is a view in longitudinal section illustrating a representative connection between a synthetic tube and a cup-shaped structure according to a representative embodiment of the invention.

In the representative shaft assembly made in accordance with the invention as shown in the drawings, a tube 1 of composite fiber-containing synthetic material, produced, for example, by winding several strips of a fiber-synthetic material simultaneously on a rotating mandrel, is attached to a cup-shaped connection structure 2 consisting of an outer sleeve 3 and an inner member 4 at one end of the sleeve. The connection structure is made of relatively hard material, such as metal. The composite synthetic tube 1 has an end portion 5 within the outer sleeve 3 which has the same inside diameter as the rest of the tube, but has a larger outside diameter. In other words, the end portion 5 has a thicker wall. Further, the structure of the end portion 5 of the tube 1 differs from the remainder of the tube in that the composite material is wound in that portion so that the fibers in the material extend predominantly in the circumferential direction whereas, in the main body of the tube, the fibers extend predominantly in the axial direction. This is illustrated in FIG. 1 wherein the angle $\alpha 1$ of the fibers with respect to the tube axis in the main portion of the tube is less than 45° whereas, in the enlarged end portion 5 which is attached to the outer sleeve 2, the angle $\alpha 2$ of the fibers with respect to the tube axis is greater than 45°, so that the fibers are oriented predominantly in the circumferential direction.

Figure 2:
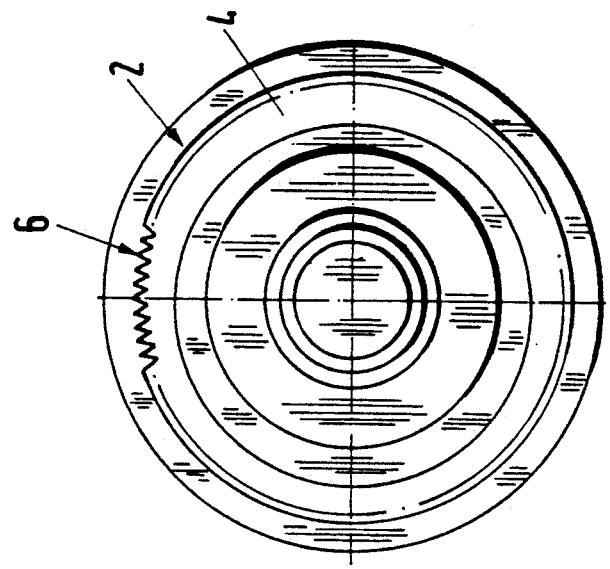
FIG. 2 is an end view of the connection shown in FIG. 1.

Considering the arrangement of the connecting structure 2 in more detail, the inner surface of the outer sleeve 3 has inwardly-directed projections 6, the shape of which is best seen in FIG. 2. These projections extend parallel to the axis 7 of the tube throughout the length of the sleeve 3 and thereby serve to secure both the tube 1 and the inner member 4 in the outer sleeve 3. The dimensions of these engaging projections are arranged so that, taking into consideration the materials used and the dimensions of the tube 1, upon pressing of the tube into the outer sleeve 2 to achieve a press fit of the several constituent parts of the assembly to produce the structure shown in the drawing, the engaging projections 6 deform the material of the tube 1 in a viscous elastic manner only, without digging into it so as to raise a chip. At the commencement of the pressing operation, this action is facilitated by a chamfer 8 at the inner edge of the righthand end of the outer sleeve 2, as shown in FIG. 1. In addition, a lubricant may be applied to the cooperating surfaces of the tube 1 and the sleeve 2 before they are pressed together and removal of the lubricant by the leading edge of the sleeve 3 during the pressing operation is inhibited by the chamfer 8 of the sleeve 2 and also by a bevel 9 in the outer surface of the tube 1 at the left end of the tube, as seen in FIG. 1.

Whereas, in the attachment of the tube 1 to the outer sleeve 2, care is taken that the tube 1 should not be permanently deformed, such permanent deformation is essentially unimportant in the attachment of the inner member 4 to the outer sleeve 3, which also utilizes the engaging projections 6, because the inner member 4 is also made of metal. Thus, in the press-fitting of these parts, a machining kind of deformation of the periphery 10 of the inner member 4 by the engaging projections 6 is permissible and, accordingly, those projections are not beveled at their left end, as viewed in FIG. 1. It will be understood, however, that, alternatively, the periphery 10 of the inner member may be shaped in a manner suitable for cooperation with the engaging projections 6. Such additional engaging projections will have a pitch diameter which is greater than that of the engaging projections of the outer sleeve in order to ensure a firm seat for the projections.

The form of the engaging projections 6 and of any additional engaging projections provided may be freely selected as long as the projections satisfy the requirements described above. It will be understood that, in each case, the engaging projections will extend substantially parallel to the axis 7 of the tube. They may be produced, for example, by knurling. As a general rule, the engaging projections 6 will appear serrated in a cross-section of the shaft assembly, as shown in FIG. 1.

The invention does not exclude the provision of an additional ring-like inner support for the tube 1 in the portion 5 engaged by the outer sleeve 2.

The invention thus provides a method that offers special advantages respecting the manufacture of shaft assemblies when cup-like connection structures are used.

Although the invention has been described herein with reference to specific embodiments, many modifications and variations therein will readily occur to those skilled in the art. Accordingly, all such variations and modifications are included within the intended scope of the invention.

We claim:

1. A method of making a shaft assembly which includes a tube of fiber-containing synthetic material and a connection structure made of rigid material having an outer sleeve with inward projections which extend substantially axially in the sleeve and an inner connecting member at one end comprising press-fitting the sleeve and the tube together at one end of the sleeve so that the projections engage and deform the tube surface to provide a rigid attachment and press-fitting the sleeve and the inner connecting member at the opposite end of the sleeve so that the projections engage the surface of the inner connecting member to provide a rigid attachment, wherein the outer sleeve and the tube are pressed together so as to deform the tube by elastic radial deformation only.

2. A method according to claim 1 wherein the outer sleeve and the inner connecting member are pressed together with cutting deformation of the surface of the inner connecting member by the projections.

3. A method according to claim 1 wherein the inner connecting member, before being press-fitted to the outer sleeve, is formed on its periphery with engaging projections for cooperation with the engaging projections of the outer sleeve and the engaging projections of the inner connecting member have a pitch diameter greater than that of the engaging projections of the outer sleeve.

4. A method according to claim 1 including applying adhesive to at least one of the cooperating surfaces of the outer sleeve, the tube and the inner connecting member before those components are press-fitted together.

5. A method according to claim 1 wherein the engaging projections are formed by knurling.

6. A method according to claim 1 including forming the tube by simultaneously winding a plurality of strips of synthetic fiber-containing material on a rotating mandrel.

7. A shaft assembly having a connecting structure comprising a metal sleeve member having longitudinally extending projections on its inner surface, a tube made of fiber-containing synthetic material having one end press-fitted into one end of the sleeve member and engaging the projections therein by elastic radial deformation only, and an inner metal connection member press-fitted into the other end of the sleeve member and engaging the projections therein to form said connecting structure for the shaft assembly.

8. A shaft assembly according to claim 7 wherein the end of the metal sleeve member which engages the tube is formed with a chamfer.

9. A shaft assembly according to claim 7 wherein the tube has a constant inside diameter and a greater wall thickness in the region of engagement of the tube and the metal sleeve member than in the portion of the tube spaced from the metal sleeve member.

10. A shaft assembly according to claim 7 wherein the orientation of the fibers in the tube extends predominantly in the circumferential direction in the portion of the tube engaged by the projections of the metal sleeve member.

11. A shaft assembly according to claim 7 wherein the orientation of the fibers in the tube extends predominantly in the axial direction in the portion of the tube which is not engaged by the projections of the metal sleeve member.

12. A shaft assembly according to claim 7 wherein the fibers in the synthetic material of the tube extend more nearly in the circumferential direction in the region engaged by the sleeve projections and more nearly in the axial direction in other regions.

* * * * *

UNITED STATES PATENT AND TRADEMARK OFFICE
CERTIFICATE OF CORRECTION

PATENT NO. : 5,230,661

DATED : July 27,1 993

INVENTOR(S) : Schreiber et al.

It is certified that error appears in the above-identified patent and that said Letters Patent is hereby corrected as shown below:

Title Page, first column: after Item [76] insert --[73] Assignee: Volkswagen AG Wolfsburg 1, Federal Republic of Germany--;

Signed and Sealed this

Twenty-first Day of June, 1994

Attest:

BRUCE LEHMAN

Attesting Officer

Commissioner of Patents and Trademarks